United States Patent Office 3,726,650
Patented Apr. 10, 1973

3,726,650
PROCESS FOR RECOVERY OF URANIUM VALUES
BY PRECIPITATION OF AMMONIUM DIURANATE
Richard K. Welty, Columbia, S.C., assignor to Westinghouse Electric Corporation, Pittsburgh, Pa.
Continuation-in-part of application Ser. No. 804,137, Mar. 4, 1969, which is a continuation-in-part of application Ser. No. 718,949, Apr. 4, 1968, both now abandoned. This application Sept. 24, 1969, Ser. No. 865,232
Int. Cl. C10g 43/00
U.S. Cl. 423—15
6 Claims

ABSTRACT OF THE DISCLOSURE

A process for the recovery of uranium as ammonium diuranate from aqueous solutions having uranyl and fluoride ions and for reducing the soluble uranium losses in the liquid waste stream thereof, by first forming an intermediate compound, uranyl fluoride ($UO_2F_2$), with dilute ammonium hydroxide to provide a solution at a pH of about 5.5 to 6.0, and then by precipitating essentially all of the uranium, as ammonium diuranate [$(NH_4)_2U_2O_7$], from the solution under controlled conditions that prevent formation of any soluble fluoride complexes, such as $UO_2F_2 \cdot 3NH_4F$, that would otherwise be ordinarily formed during the precipitation of the ammonium diuranate.

CROSS-REFERENCE TO RELATED APPLICATION

This invention is a continuation-in-part of the copending application, Ser. No. 804,137, filed Mar. 4, 1969, now abandoned which is a continuation-in-part of application Ser. No. 718,949, filed Apr. 4, 1968, now abandoned.

BACKGROUND OF THE INVENTION

Field of the invention

This invention relates to a process for the recovery of uranium values from aqueous solutions containing uranyl and fluoride ions, and, more particularly, it pertains to the precipitation of ammonium diuranate by a two stage treatment with ammonium hydroxide.

Description of the prior art

One method of preparing uranium dioxide ($UO_2$) from uranium hexafluoride ($UF_6$) involves an initial reaction of the $UF_6$ with water to form an aqueous solution of uranyl fluoride ($UO_2F_2$) and hydrofluoric acid (HF). One advantage of this procedure is that aqueous uranyl fluoride is easier and more convenient to handle than uranium hexafluoride which is a gas. Thereafter, it has been a conventional practice to add a concentrated solution of ammonium hydroxide greatly in excess of the necessary stoichiometric amount of ammonium hydroxide to react with the uranyl fluoride solution in order to precipitate the uranium in the form of ammonium diuranate [$(NH_4)_2U_2O_7$]. The latter compound was then digested at a specific temperature after which additional ammonium hydroxide was added to prevent substantial complexing of the uranyl ions by any fluoride ions. It will be understood that these processes required large excesses of ammonium hydroxide. Such processes and a variation thereof are disclosed in U.S. Pats. Nos. 2,466,118 and 3,394,997.

The precipitation of ammonium diuranate

[$(NH_4)_2U_2O_7$]

with ammonium hydroxide is not complete at the stoichiometric point because of the complex nature of the uranyl fluoride solutions. A large excess of the ammonium hydroxide is used to drive the reaction to completion. An example of the reaction is set forth in the following formula:

$$2UO_2F_2 + 4HF + 10NH_4OH \rightarrow (NH_4)_2U_2O_7 + 8NH_4F + 7H_2O \quad (1)$$

A disadvantage of the foregoing one step procedure is that it requires a great excess of ammonium hydroxide. A more critical shortcoming is that the ammonium diuranate precipitate formed does not completely separate and recover all of the uranium from the uranyl fluoride. These reaction products usually include from 1.5% to 2.0% of uranium fluoride present as a mixed fluoride, particularly $UO_2F_2 \cdot 3NH_4F$, which is relatively soluble and which therefore leads to a loss of uranium in the waste stream. Such fluoride complexes are extremely difficult to break in order to recover the uranium.

From extended investigation it has been found that Formula 1 defines an ideal reaction which is fact does not occur quantitatively even under the most ideal conditions. In practice it has been found that the one step reaction of Formula 1 results in a number of side reactions which occur so rapidly that the HF does not preferentially react to completion with $NH_4OH$ to produce $NH_4F$. Rather, other reactions occur simultaneously between HF, $UO_2F_2$, and $NH_4OH$, which result in formation of the complex, i.e., $UO_2F_2 \cdot 3NH_4F$. Once these uranium complexes are formed they go into solution and the uranium values are lost because they cannot be readily recovered therefrom and are carried away in the waste stream because of their solubility in water.

In addition, the process of Pat. No. 2,466,118 employs a concentrated solution of ammonia (8 to 15 molar), because in that fluoride system the solubility of uranium is lowest when the ratio of ammonia to uranium is highest. Thus, the initial addition of concentrated ammonium hydroxide is sufficient to precipitate a major portion of uranium, and suitably constitutes an excess over the stoichiometric quantity of ammonium hydroxide required to neutralize any acidity and to precipitate all of the uranium in the absence of fluoride ions. The resulting product, $UO_2$, is finely divided and is difficult to dewater and dry.

The process of Pat. No. 3,394,997 employs a large volume of dilute aqueous ammonium solution substantially less than 2 molar, to precipitate ammonium diuranate [$(NH_4)_2U_2O_7$], which is relatively crystalline and granular in nature. While the resulting product $UO_2$ readily dewaters and dries rapidly it is difficult to sinter. The process, of course, is still subject to a 1 to 2% uranium loss.

Although the specific reaction for the precipitation of $UO_2F_2$ under equilibrium conditions with $NH_4OH$ should lead at least as an initial step, to hydrated $UO_2(OH)_2$, it is believed that other additional reactions occur (such as dimerization, hydration, and ammoniation) to preclude the exclusive specific reaction intended. Stoichiometric ammonium diuranate has never been reported as being directly produced from aqueous medium directly in a single step so that polymerization most probably must occur.

Ammonium diuranate is believed to be a more complex compound than is indicated by the commonly accepted formula $(NH_4)_2U_2O_7$. There are indications that some molecules may have many atoms of uranium, up to 7 or more, and that more than two ($NH_4$) groups may be present. However, the formula $(NH_4)_2U_2O_7$ represents quite closely the average composition of this complex uranium compound.

SUMMARY OF THE INVENTION

In accordance with this invention it has been found that the foregoing disadvantages may be overcome by first forming as an intermediate compound ammonium fluoride (NH₄F) at a pH of from about 5.5 to about 6, a good average being a pH of 5.8, which prevents the uranyl ion from entering fluoride complexing reactions and at the same time favors formation of $UO_2(OH)_2$. The process requires an initial addition of only a stoichiometric amount of a solution of ~1.19 Normal ammonium hydroxide to the uranyl fluoride solution to form ammonium fluoride with about 90% of the HF. After equilibrium is reached, more dilute ammonium hydroxide (about 1 Normal) is added in a second step to form ammonium diuranate precipitate almost quantitatively. The reaction is carried out at about 70° C., though it may be carried out at temperatures moderately above room temperature or below room temperature. Under these conditions the ammonium diuranate reaction is essentially complete and substantially no complexes of uranium and fluoride result. A large volume of water per mol of uranium is employed in both steps. The ammonium diuranate is readily separated and is subsequently readily reduced to uranium dioxide in any manner.

Accordingly, it is a general object of this invention to provide a procedure for reducing uranium losses by forming an intermediate solution that will prevent the uranyl ion from complexing into stable, water soluble fluorides and at the same time to create a slightly acid condition which will enable further reaction upon adding dilute ammonium hydroxide to produce ammonium diuranate as a precipitation product.

It is another object of this invention to provide a process for reducing uranium losses during the precipitation of ammonium diuranate from an aqueous solution of uranyl ions and fluoride ions, by the initial addition of up to a stochiometric amount of relatively dilute ammonium hydroxide to form ammonium fluoride while slightly acidic and favoring the formation of the intermediate uranyl hydroxide when dilute ammonium hydroxide is thereafter added, and precipitating ammonium diuranate by reaction with such additional ammonium hydroxide.

Finally, it is an object of this invention to satisfy the foregoing objects and desiderata in a single and effective manner.

Generally, the process of this inveniton for reducing soluble uranium losses comprises the steps of initially introducing into a uranyl fluoride-HF solution an amount of ammonium hydroxide equal to or slightly less than the stoichiometric requirement to neutralize the HF, and provide a pH of about 5.5 and not appreciably above 6.0, and reaching equilibrium, whereby on the addition of more NH₄OH, the formation of the intermediate compound [uranyl hydroxide, $UO_2(OH)_2$] is favored in order to avoid the formation of uranyl fluoride complexes ($UO_2F_2 \cdot 3NH_4F$) which would otherwise be formed if a greater than stoichiometric amount of ammonium hydroxide is added in the initial reaction so that the solution is alkaline i.e. at a pH of 7 or higher. By limiting the amount of ammonium hydroxide added initially, during the next step ammonium fluoride is formed from substantially all of the fluorides in the solution, leaving the uranyl ions disposed to combine with ammonium hydroxide to form ammonium diuranate. Thereafter in the second step additional dilute ammonium hydroxide is added to react with the uranyl fluoride to precipitate almost completely the uranium as ammonium diuranate and to prevent any substantial complexing of uranyl ions by ammonium fluoride ions. Separating the resulting ammonium diuranate precipitate from the solution is easy since it is not too fine. It will be appreciated that in order to prevent excess alkalinity in the solution as the dilute ammonium hydroxide solutions are added, slow additions of the ammonium hydroxide and rapid and thorough stirring, or equivalent procedures, are required.

BRIEF DESCRIPTION OF THE DRAWINGS

For a better understanding of the invention reference is made to the drawings, in which.

DESCRIPTION OF THE PREFERRED EMBODIMENT

Figure 1:
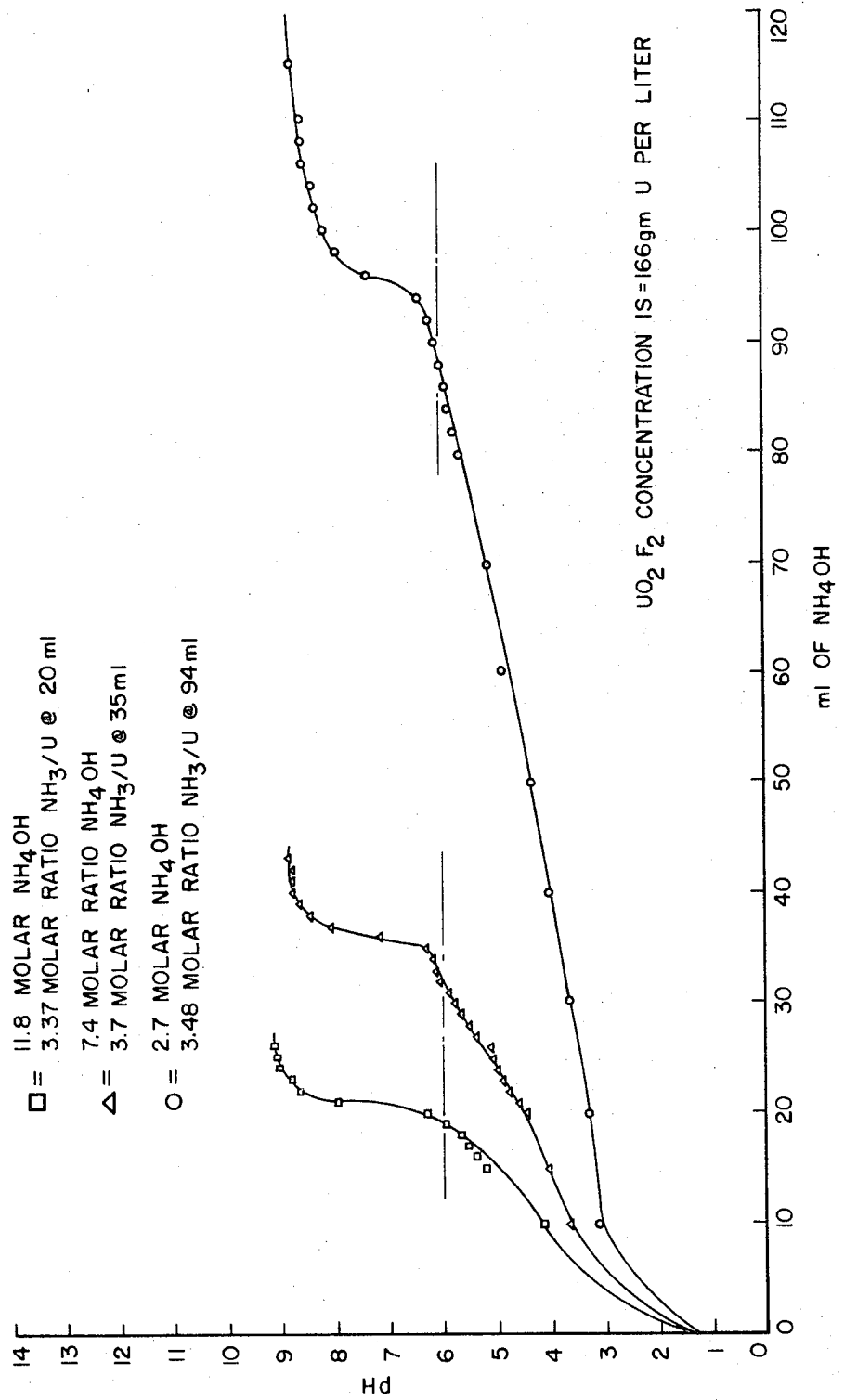
FIG. 1 is a titration graph showing the relationship of pH to milliliters of NH₄OH for three different molar concentrations of NH₄OH and three different ratios of NH₃/U.

In accordance with the present invention the process for recovering uranium from an aqueous solution containing uranyl and fluoride ions, which aqueous solution may be produced by introducing UF₆ into water, involves two key steps: the first step involves the following formula:

$$UO_2F_2 + 4NH_4OH + 4HF \rightarrow UO_2F_2 + 4NH_4F + 4H_2O + \text{slight excess HF} \quad (2)$$

having an equilibrium pH of about 5.5 to 6.0. The ammonium hydroxide is preferably about 1.19 N (usable range is from 1.1 to 1.25), and is added slowly with rapid stirring to the aqueous solution. As shown in the Formula 2 the amount of ammonium hydroxide added to a solution containing uranyl fluoride and hydrogen fluoride is limited to slightly less than the stoichiometric amount of ammonium hydroxide needed to react with all of the hydrogen fluoride present. However, it is critical that a slight amount of HF remain unneutralized so that the pH of the solution at equilibrium is from about 5.5 to about 6.0.

In Formula 2 only the NH₄OH and HF interact to form NH₄F and H₂O, the $UO_2F_2$ being essentially unreacted at this stage.

By limiting the amount and the normality of ammonium hydroxide added, as well as controlling the pH, ammonium fluoride is preferentially formed. Under these conditions the reactivity of the uranium compound in the resulting solution is low so that the formation of undesirable complexes, such as $UO_2F_2 \cdot 3NH_4F$, is limited. Thus, as shown in Formula 2, essentially all of the fluoride ions of the HF are preferably combined with the ammonium ions to form ammonium fluoride, leaving the uranyl compound free to react with subsequently added dilute ammonium hydroxide.

After equilibrium is reached, the resulting solution is then treated with additional dilute (about 1 Normal) ammonium hydroxide, for instance, by adding at least six more (ranging from 6 to 10) moles per each mole of $UO_2F_2$ plus enough to neutralize the residual HF present. The reaction proceeds in accordance with the following formula:

$$2UO_2F_2 + 7NH_4OH + HF \rightarrow 2UO_2(OH)_2 + 5NH_4F + 2NH_4OH + H_2O \rightarrow (NH_4)_2U_2O_7 + 5NH_4F + 4H_2O \quad (3)$$

In this formula it is assumed that one mole of HF is present for two moles of $UO_2F_2$ though in fact substantially less HF would usually be present. As shown, the intermediate product, uranyl hydroxide, immediately reacts with additional ammonium hydroxide to form ammonium diuranate which precipitates out of solution. Substantially complete precipitation of the uranium as ammonium diuranate occurs and essentially no uranium compound is present in the liquid.

The two-step process involves a time relation. If the total reaction is carried out in a one step reaction by the addition of NH₄OH in substantial excess of the stoichiometric amount required to neutralize HF, the reactions are so rapid that the NH₄F being formed cannot be prevented from entering into the formation of the uranium complexes before the critically necessary $UO_2(OH)_2$ forms.

As a result of the two-step process less uranium is lost in the waste stream in the form of fluoride complexes which are difficult to separate and to recover.

For the foregoing procedure to function it is desirable that slightly less than the substantially stoichiometric amount of dilute ammonium hydroxide to neutralize all of the HF be added for the first reaction. To this end for each mole of uranyl ion present in the aqueous solution about 4 moles of ammonium hydroxide are added. The preferred molar ratio of $NH_3$ to uranium is about 3.51:1 thereby providing a solution at a pH of from about 5.5 to 6.0.

Referring to FIG. 1, there is illustrated the relationship between pH and milliliters of ammonium hydroxide for tests that were made for three different molar concentrations (11.8 molar, 7.4 molar, and 2.7 molar) of $NH_4OH$. In FIG. 1 the turning point for the curve where the pH rises most rapidly for each increment of $NH_4OH$ in each test is at a pH value of approximately $6.1 \pm 0.2$, which value appears to be reproducible at any normality of $NH_4OH$. For this reason, a small amount of HF is left in the first stage solution to insure that the pH will be the acid state, namely, $6.1 \pm 0.2$. The three curves of FIG. 1 illustrate the widely differing effect of adding different concentrations of ammonium hydroxide to uranyl fluoride solutions each containing 166 grams of uranium per liter in the form of $UO_2F_2$. The critical point in these titration curves insofar as the present invention is concerned occurs at a pH of about 6. The extreme left curve shows that the addition of one milliliter of the 11.8 molar $NH_4OH$ changes the pH of the solution from about 6.3 to 8, while the middle curve shows that one milliliter of 7.4 molar $NH_4OH$ causes the pH to change from about 6.3 to 7.2. However, the right hand curve shows that two milliliters of the 2.7 molar $NH_4OH$ changes the pH from about 6.1 to 6.3 and one additional milliliter brings this to a pH of 6.6. It is in the pH range of $6.1 \pm 0.2$ that $UO_2(OH)_2$ is formed and thereby the addition of a unit quantity of strong $NH_4OH$ tends to increase the pH excessively so as to cause this necessary reaction to be minimized and conditions established for an alkaline state wherein the undesirable $UO_2F_2 \cdot 3NH_4F$ complex forms.

It is a salient feature of this invention that no free or reactive ammonia is present in the solution at the concusion of the initial step. Because of the respective proportions and concentrations of the $UO_2F_2$, HF, and $NH_4F$ in combination with the critical pH of $6.1 \pm 0.2$, no side reactions forming undesirable complexes with the uranium can take place during subsequent addition of ammonia if properly and reasonably carried out. However, in practice the pH is adjusted to a range (5.5 to 6) which is slightly below the critical point, i.e. 6.1. The advantage of the slightly lower range of pH operation is two-fold: increased resistance to corrosion in process equipment and increased controlled mass reaction between the $UF_6$ and $H_2O$ with the available of $NH_3$. This solute in this solution has been found to react controllably with subsequently added dilute (about 1 normal) $NH_4OH$ in the manner disclosed hereinafter, to produce a precipitate of ammonium diuranate $[(NH_4)_3U_2O_7]$, quantitatively from the $UO_2F_2$. Consequently a feature of the invention is to combine the fluoride with the ammonia before it forms the fluoride complex with uranium.

In the second step (Formula 3), for each mole of uranyl fluoride present about 7 moles of ammonium hydroxide are added. The ammonium hydroxide should not exceed 3 N, and is preferably about 1 Normal. The molar ratio of ammonium to uranium is at least 7:1, but not over about 10:1 since no benefits flow any great excess of ammonia.

It has been found that the losses of uranium in the waste stream by the two step procedure of this invention is less by a factor of better than 10 as compared with the losses in the best previously known single step procedure of conventional methods wherein a 7 to 13 fold excess of ammonium hydroxide to uranyl fluoride is employed. This results because the process of the present invention overcomes the disadvantages of prior procedures; namely, the formation of relatively stable, water soluble fluoride complexes with uranium, that lead to the loss of uranium in the waste stream. Once the complexes are formed they are exceedingly difficult to recover. As a result, the present process enables the recovery of nearly all of the uranium involved in the reaction. Also, less ammonium hydroxide is needed in the present invention. Further the process is much faster since no digestion and heating is required.

The following example illustrates the practice of the invention:

EXAMPLE

Figure 2:
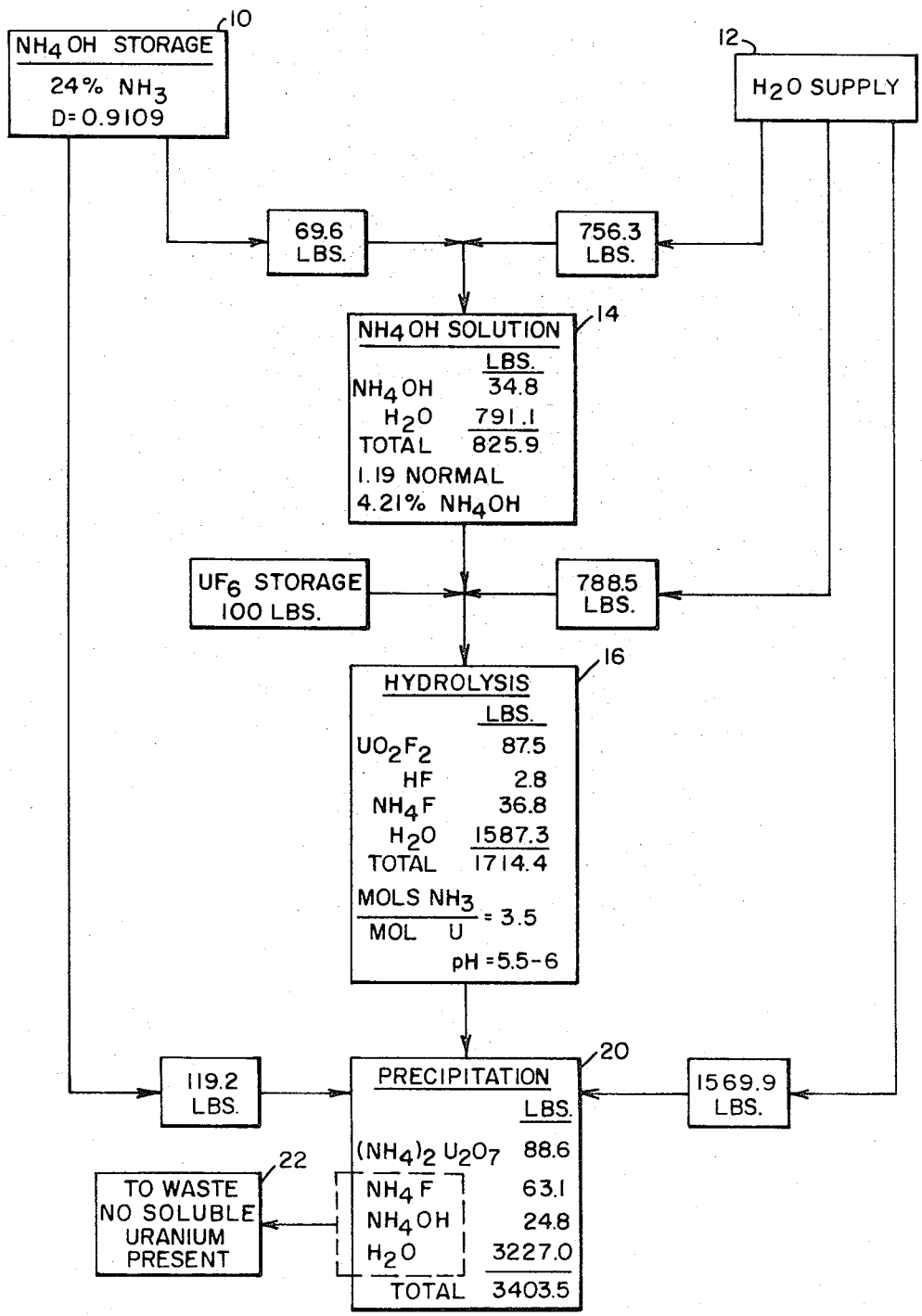
FIG. 2 is a flow sheet for an embodiment of the process of this invention for producing $(NH_4)_2U_2O_7$ from $UO_2F_2$.

As shown in the flow sheet of FIG. 2, a portion comprising 69.6 lbs. of concentrated $NH_4OH$ (24% $NH_3$) solution was withdrawn from a solution storage tank 10 and mixed with 756.3 lbs. of water from storage tank 12 to produce a 4.21% $NH_4OH$ solution (1.19 N) 14. A sample comprising a solution of 100.0 lbs. of $UF_6$ and 788.5 lbs. of $H_2O$ was slowly added to and rapidly mixed with the solution 14. These amounts of $NH_4OH$ solution 14 and $UF_6$ were selected to provide, after equilibrium is reached, a molar ratio of $NH_3$ to U ($NH_3/U$) of 3.5 and a pH of 5.5 to 6. At the end of the first step of the process, the exit stream 16 included 87.5 lbs. of $UO_2F_2$, 2.8 lbs. of HF, 36.8 lbs. of $NH_4F$, and 1587.3 lbs. of $H_2O$.

A quantity (119.2 lbs.) of the solution 10 containing 59.6 lbs. of $NH_4OH$ and 59.6 lbs. of water and 1569.9 lbs. of water 12 were mixed to provide the 1689.1 lbs. of a 3.52% $NH_4OH$ solution 20. Equal volumes of the solution 20 and the solution 16 were sprayed through a nozzle to form a common stream into a precipitator vessel. This spraying ensures a controlled reaction at a pH of about 8.5. A solution recirculation system including a pump was employed with the vessel to assure thorough, rapid, and complete interaction between the previously sprayed solutions 16 and 20. The exit stream contained 88.6 lbs. of $(NH_4)_2U_2O_7$ (fine, crystalline precipitate), 63.1 lbs. of $NH_4F$, 24.8 lbs. of $NH_4OH$, and 3227 lbs. of $H_2O$. The $(NH_4)_2U_2O_7$ was recovered completely in precipitated crystalline form. The balance including $NH_4F$, $NH_4OH$, and $H_2O$ was dumped as waste 22. An analysis indicated no soluble uranium present in the waste. It will be observed that of a total of 94.4 lbs. of $NH_4OH$ employed, only 24.8 lbs. was wasted. This is much less than heretofore used to recover a similar quantity of uranium in prior art processes.

The process can be applied to enriched $UF_6$. For example, 3.5% enriched $UF_6$ is dissolved in water to form $UO_2F_2$+HF, which is then reacted in two stages with ammonium hydroxide as disclosed in the preceding detailed example herein.

Although the best known embodiment of the invention has been described in detail, it is understood that the invention is not limited thereto or thereby.

What is claimed is:

1. A process for the substantially complete recovery of uranium as ammonium diurante from an aqueous solution containing uranyl fluoride and hydrogen fluoride and derived by dissolving uranium hexafluoride in water comprising the steps of first introducing into said solution slightly less than the stoichiometric amount of dilute ammonium hydroxide of from about 1.1 to 1.25 N to react with the hydrogen fluoride to form ammonium fluoride therewith while maintaining a small amount of unneutralized HF to produce after equilibrium is reached, a slightly acid solution of a pH of from about 5.5 to 6, and after equilibrium is reached, rapidly adding to the resulting solution additional dilute ammonium hydroxide of a normality of less than 3 in an amount to provide sufficient ammonium ions to react with the uranyl fluoride and the residual hydrogen fluoride to precipitate almost completely the uranium as ammonium diurante and to react with the hydrogen fluoride and the fluorine in the uranyl fluoride to form only ammonium fluoride, the process preventing any appreciable complexing of uranyl, ammonium and fluoride ions into undesirable stable compounds, and separating the ammonium diuranate precipitate from the solution.

2. The process of claim 1 wherein in the first step, for each mole of uranyl ion present in the aqueous solution about 3.5 moles of ammonium hydroxide is added.

3. The process of claim 1 wherein for each mole of uranyl ion present about 6 to 10 moles of ammonium hydroxide are added in the second addition.

4. The process of claim 1 wherein in the second step for each mole of uranyl fluoride present about 7 moles of ammonium hydroxide are added by rapid admixing the molar ratio of ammonia to uranium being not over 10 to 1, whereby the fluoride from the hydrogen fluoride and the uranyl fluoride reacts with the ammonia ion to form ammonium fluoride and ammonium diuranate without forming fluoride-uranium complexes.

5. The process of claim 1 wherein the $UO_2F_2$ containing aqueous solution at equilibrium in the first step is sprayed to intermingle with a spray of ammonium hydroxide whereby to produce a reaction product of ammonium diuranate.

6. The process of efficiently converting uranyl fluoride to ammonium diuranate which comprises initially adding to a solution of $UF_6$ dissolved in water slightly less than a stoichiometric amount of ammonium hydroxide of from 1.1 to 1.25 N to react with HF in water to form an aqueous solution of $NH_4F$ without reacting with the $UO_2F_2$ in the original solution to provide at equilibrium a solution pH of 5.5 to 6, then rapidly adding to the resulting solution at least 7 moles and not in excess of 10 moles of ammonium hydroxide of a normality not exceeding 3 per mole of uranyl ion to form a precipitate of substantially all the uranium as ammonium diuranate.

References Cited

UNITED STATES PATENTS

| | | | |
|---|---|---|---|
| 2,466,118 | 5/1949 | Miller et al. | 23—335 |
| 3,272,602 | 9/1966 | Suehiro | 23—335 |
| 3,394,997 | 7/1968 | Hollander | 23—335 |

CARL D. QUARFORTH, Primary Examiner

F. M. GITTES, Assistant Examiner

U.S. Cl. X.R.

423—254